United States Patent [19]

Oshima et al.

[11] Patent Number: 5,432,145
[45] Date of Patent: Jul. 11, 1995

[54] PROTECTIVE LAYER TRANSFER SHEET

[75] Inventors: Katsuyuki Oshima; Hideo Fujimura; Jitsuhiko Ando, all of Tokyo, Japan

[73] Assignee: Dai Nippon Insatsu Kabushiki Kaisha, Japan

[21] Appl. No.: 82,098

[22] Filed: Jun. 25, 1993

Related U.S. Application Data

[60] Division of Ser. No. 895,445, Jun. 8, 1992, Pat. No. 5,244,234, which is a continuation of Ser. No. 490,590, May 14, 1990, abandoned.

[30] Foreign Application Priority Data

Sep. 12, 1988 [JP] Japan ................ 226428

[51] Int. Cl.⁶ .................. B41M 5/035; B41M 5/38
[52] U.S. Cl. .................. 503/227; 428/195; 428/484; 428/913; 428/914
[58] Field of Search .............. 8/471; 428/195, 204, 428/913, 914, 484; 503/227

[56] References Cited

U.S. PATENT DOCUMENTS

| | | | |
|---|---|---|---|
| 3,582,439 | 6/1971 | Thomas | 161/5 |
| 3,930,924 | 1/1976 | Oka et al. | 156/268 |
| 4,133,926 | 1/1979 | Vorrier et al. | 428/200 |
| 4,395,434 | 7/1983 | Imada et al. | 427/38 |
| 4,402,887 | 9/1983 | Kuriyama et al. | 264/22 |
| 4,519,632 | 5/1985 | Parkinson et al. | 283/75 |
| 4,599,259 | 7/1986 | Kobayashi et al. | 428/204 |
| 4,626,256 | 12/1986 | Kawasaki et al. | 8/471 |
| 4,666,320 | 5/1987 | Kobayashi et al. | 400/241.1 |
| 4,720,480 | 1/1988 | Ito et al. | 503/227 |
| 4,738,555 | 4/1988 | Nagashima | 400/240 |
| 4,738,949 | 4/1988 | Sethi et al. | 503/227 |
| 4,837,200 | 6/1989 | Kondo et al. | 503/227 |
| 4,853,365 | 8/1989 | Jongewaard et al. | 503/227 |
| 4,869,941 | 9/1989 | Ohki | 428/40 |
| 4,889,749 | 12/1969 | Ohashi et al. | 428/13 |
| 4,916,007 | 4/1990 | Manning et al. | 428/203 |
| 4,923,848 | 5/1990 | Akada et al. | 503/227 |
| 4,977,136 | 12/1990 | Fujiwara et al. | 503/227 |
| 4,985,397 | 1/1991 | Uemura et al. | 503/227 |
| 5,095,001 | 3/1992 | Miles et al. | 503/227 |

FOREIGN PATENT DOCUMENTS

| | | | |
|---|---|---|---|
| 58-148778 | 9/1983 | Japan | 503/227 |
| 58-149048 | 9/1983 | Japan | 428/204 |
| 59-76298 | 5/1984 | Japan | 428/204 |
| 59-85793 | 5/1984 | Japan | 503/227 |
| 59-127798 | 7/1984 | Japan | 503/227 |
| 60-23096 | 2/1985 | Japan | 503/227 |
| 60-64895 | 4/1985 | Japan | 503/227 |
| 61-51391 | 3/1986 | Japan | 503/227 |
| 61-41438 | 9/1986 | Japan | 503/227 |
| 62-142692 | 6/1987 | Japan | 503/227 |
| 62-169679 | 7/1987 | Japan | 503/227 |
| 1-159652 | 6/1989 | Japan | 428/204 |
| 4-142987 | 5/1992 | Japan | 503/227 |

*Primary Examiner*—B. Hamilton Hess
*Attorney, Agent, or Firm*—Parkhurst, Wendel & Rossi

[57] ABSTRACT

A protective layer transfer sheet, including a heat-resistant layer provided on one surface of a substrate film, and an adhesive layer, a releasable protective layer, and a heat seal layer laminated in this order on the other surface of the substrate film.

15 Claims, 1 Drawing Sheet

PROTECTIVE LAYER TRANSFER SHEET

This is a division of application Ser. No. 07/895,445 filed Jun. 8, 1992, now U.S. Pat. No. 5,244,234, which in turn is a Rule 62 continuation of Ser. No. 07/490,590, filed May 14, 1990, now abandoned.

TECHNICAL FIELD

This invention relates to a recording material, more particularly to an image receiving medium made of a polyvinyl chloride which can form easily and sharply a complicated image such as a picture of a face, and the like, to be formed on an ID card according to a heat transfer system.

BACKGROUND ART

In the prior art, many cards such as identification certificates, driving licenses, membership cards, etc. have been used, and on these cards is recorded various information for clarifying identification, and the like of the owner. Particularly, on ID cards, and the like, a face photograph is the most important feature.

A classical method for imparting face photographs on various cards is a method of serving a face photograph to a predetermined portion of a card substrate by use of an adhesive, but this method is very cumbersome in its operation, and also has the drawback that unevenness is created on the card surface.

Whereas, in the prior art, there has been developed an image forming method according to the sublimation transfer method. The sublimation transfer method is a method in which a sublimation transfer sheet, having a layer containing a dye which is sublimation transferred by heat on the surface of a substrate film and an image receiving sheet are superposed, and a desired image is formed on the image receiving sheet by heating with a thermal head according to an image information from the back of the sublimation transfer sheet, and there is the advantage that it can be practiced by a simple heat transfer printer.

Whereas, when the sublimation transfer system is applied to a card medium such as an ID card, the card substrate is demanded to have sufficient dyeability for a sublimable dye. However, most of the card substrates of the prior art have no sufficient dyeability for sublimable dyes, and therefore no image formation can be effected thereon as such. As the method for solving such drawback, a method of previously forming an image receiving layer excellent in dyeability for a sublimable dye may be conceivable, but formation of such image receiving layer on a card substrate is cumbersome in steps, whereby there is the problem of increasing the production cost of the card substrate. Further, when an image receiving layer is provided separately on the surface of a card substrate, there will ensue such problems that the card substrate may be curled or the image receiving layer may be peeled off as caused by the heat applied during image formation.

DISCLOSURE OF THE INVENTION

The present invention has been accomplished in view of the problems of the prior art as described above, and its object is to provide an image receiving medium which is not required to provide separately an image receiving layer on a card substrate, can effect image formation of a face photograph according to the heat transfer system sharply and quickly, and yet generates no curls which otherwise tend to be caused by heat transfer printing.

For accomplishing the object as mentioned above, the image receiving medium is an image receiving medium to be used in combination with a heat transfer sheet, characterized in that the image receiving medium comprises a laminate of at least one polyvinyl chloride resin sheets, and at least a layer of the image receiving medium superposed on the heat transfer sheet which receives the dye from the heat transfer sheet comprises a polyvinyl chloride resin composition containing 0.1 to 10 parts by weight of a plasticizer based on 100 parts by weight of the polyvinyl chloride resin.

The image receiving medium of the present invention uses a polyvinyl chloride vinyl resin as the main agent, and yet a plasticizer is incorporated in the main agent and its amount contained is made to be controlled strictly, and therefore an image receiving medium excellent in both image forming characteristic and image quality is obtained also without requiring separate formation of an image receiving layer.

Particularly, in the present invention, by making the structure of the image receiving medium a symmetrical laminate structure of three layers, the problem of curl which is liable to be generated in the heat transfer system can be effectively prevented.

Further, in the present invention, by controlling strictly the softening temperature of the image receiving surface of the image receiving medium within a specific range, further improvement of printing characteristic can be effected.

Still further, in the image receiving medium of the present invention, the image quality can be made further excellent by containing no pigment in the image receiving surface of the image receiving medium at all, thus having a specific feature also in this point.

BEST MODES FOR PRACTICING THE INVENTION

In the following, the present invention is described in more detail by referring to preferred embodiments.

The polyvinyl chloride resin to be used in the present invention may be known per se.

In the present invention, in forming an image receiving medium from polyvinyl chloride, at least as the layer constituting the image receiving layer, an image receiving medium is molded by using one including 0.1 to 10 parts by weight of a plasticizer per 100 parts by weight of polyvinyl chloride. By this, the image receiving medium exhibits sufficiently good dyeability of a sublimable dye.

As the plasticizer to be used in the present invention, phthalate plasticizers, phosphate plasticizers, aliphatic dibasic acid ester plasticizers, epoxy plasticizers, polyester plasticizers, chlorinated paraffins, etc. can be used. Specifically, plasticizers known in the prior art can be preferably used, including dibutyl phthalate, di-n-octyl phthalate, di-(2-ethylhexyl) phthalate, dinonyl phthalate, dilauryl phthalate, butyl lauryl phthalate, butyl benzyl phthalate, di-(2-ethylhexyl) adipate, di-(2-ethylhexyl) sebacate, tricresyl phosphate, tri-(2-ethylhexyl)

phosphate, triethylene glycol ester, tetraethylene glycol ester, epoxy fatty acid ester, etc.

The amount of these plasticizers used may be 0.1 to 10 parts by weight per 100 parts by weight of the above-mentioned polyvinyl chloride, and a particularly preferable range is from 3 to 5 parts by weight. It is necessary to control strictly the amount of the plasticizer used, and with an amount less than 0.1 part by weight, dyeability onto a sublimable dye is insufficient, while if it exceeds 10 parts by weight, the card material lacks rigidity to become soft, whereby the dye layer of the sublimation type heat transfer sheet may be used during heat transfer to make the card substrate and the heat transfer sheet unpeelable, or abnormal transfer such as peel-off of the dye layer from the heat transfer may occur. Also, blurring occurs on the printed image during sublimation transfer thus precluding sharp image undesirably.

Also, in the preferred embodiment of the present invention, when 0.1 to 5 parts by weight of a lubricant per 100 parts by weight of polyvinyl chloride are included in addition to the above-described plasticizer, no bad influence will appear even if the plasticizer may be included in polyvinyl chloride in a relatively larger amount, for example, at a ratio of 5 to 10 parts by weight, but on the contrary it has been confirmed that printing characteristics are improved. More specifically, the present inventor has found that blocking of the transfer sheet during transfer is prevented, and yet dyeability with the sublimable dye of the image receiving medium obtained is further improved by such complex addition.

As such lubricant, all of the lubricants known in the art such as fatty acids, fatty acid amides, waxes, paraffins, etc. can be used. If the amount of these lubricants used is too small, there is no advantage by addition, while if it is too much, the surface toughening of the image receiving medium obtained will undesirably occur. Also, by use of these lubricants, not only dyeability of a sublimable dye can be improved, but also adhesion between the heat transfer sheet and the image receiving medium is little even by use of a relatively higher temperature during sublimation transfer, whereby an image of higher density can be formed efficiently.

The main components constituting the image receiving medium have been as described above, but of course in the present invention, colored pigments, white pigments, extender pigments, fillers, UV-absorbers, antistatic agents, heat stabilizers, antioxidants, fluorescent brighteners, etc. can also be used additionally.

The image receiving medium of the present invention is obtained by blending the necessary components as described above, and molding the blended product by the formation method known in the art such as the calendering method, the extrusion method, etc. into a sheet with a thickness of, for example, about 0.05 to 1 mm, and the present invention is inclusive of both the sheet before cut into the so called card size and those cut into the card size.

Figure 1:
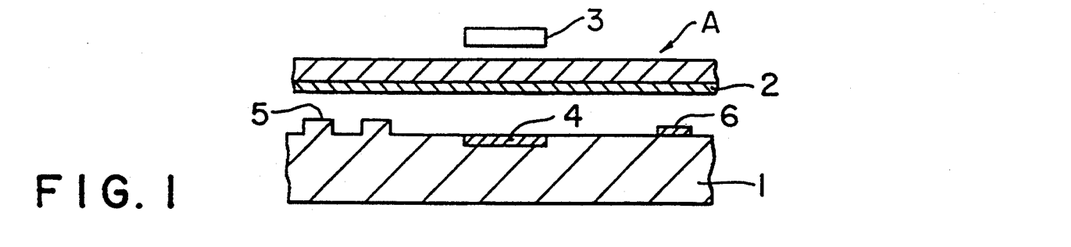
FIG. 1, FIG. 2, FIG. 3, FIG. 5 AND FIG. 6 are respectively sectional views showing the constitution of the image receiving medium according to Examples of the present invention.
Figure 2:
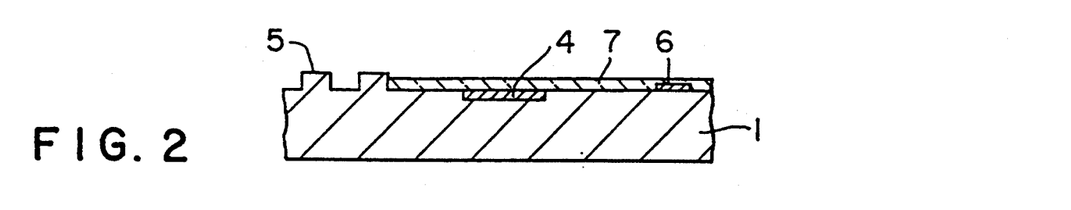

FIG. 1 and FIG. 2 are sectional views of the basic mode of the image receiving medium of the present invention, and this is shaped in a sheet with a thickness of about 0.1 to 1 mm. By superposing a known sublimation type heat transfer sheet A with the dye layer 2 opposed onto the surface of the image receiving member 1 and heating with a thermal head 3 from the back of the sublimation transfer sheet A, a desired image 4 is formed on the surface of the image receiving medium 1.

Of course, such image receiving medium 1 may also have an embossed pattern 5 or another printing pattern 6 previously formed thereon, and also, these emboss 5 and printing pattern 6 may be provided after sublimation transfer, and further a transparent protective layer 7 may be formed on the whole surface or a part of its surface for improvement of durability of these images.

Figure 3:
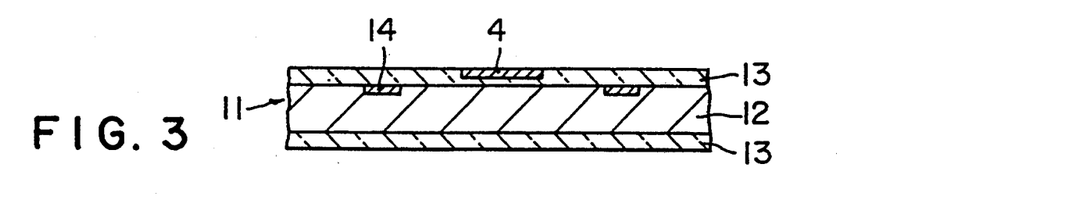

An example shown in FIG. 3 shows a sectional view of the image receiving medium of another preferred embodiment of the present invention. The image receiving medium 11 of this example has oversheets (transparent polyvinyl chloride layers) 13 laminated on both surfaces of a center core 12 containing a white pigment (for example, a white rigid polyvinyl chloride resin having a thickness of 0.1 to 0.8 mm, etc.). At least one of the oversheets 13 contains a specific amount of a plasticizer (and a lubricant) as described above. In this example, the center core 12 is not necessarily required to contain a predetermined amount of plasticizer, and the oversheets 13 on its surfaces have sufficient dyeability similarly as described above. In this example, on the surfaces of the center core 12, various printed patterns 14 can be previously formed.

As described above, formation of the structure into a symmetrical laminate structure of three layers is very effective in preventing effectively the problem of curl which is liable to be generated during heat transfer in the prior art. Also, by forming the dye receiving surface of a transparent polyvinyl chloride resin, the depth, the cubic feeling of image are good, and further since the dye receiving layer contains no pigment, luster is good and also coarseness on the printed surface is little.

Further, the image receiving medium of the present invention can also have other recordings, such as magnetic recording layer, writing layer, IC memory, bar code, etc. previously provided on its surface.

Also, in the present invention, by restricting the soft temperature (according to the standard defined in JIS-K-6734) of the above-mentioned polyvinyl chloride composition constituting the image receiving medium strictly within the range of from 50° to 70° C., printing characteristics, particularly operability, dye dyeability and blurring prevention of image in heat transfer by use of a thermal head can be improved, and further one with good emboss characteristics (formation characteristic of embossed letters) can be obtained.

In this case, at a soft temperature lower than 50° C., abnormal transfer frequently occurs, and also blurring of image after printing is increased, while if the soft temperature exceeds 70° C., dye dyeability will be lowered undesirably markedly. Besides, if the soft temperature exceeds 70° C., it becomes difficult to form good embossed letters, and fine cracks may be formed at the embossed portion unsuitably.

The image receiving medium in the present invention may also contain an antistatic agent, or an antistatic agent may be also coated on the surface. As the antistatic agent, there can be employed cationic surfactants (e.g. quaternary ammonium salts, polyamine derivatives, etc.), anionic surfactants (e.g. alkylphosphates, etc.), amphoteric surfactants (e.g. those of the betaine type, etc.) or nonionic surfactants (e.g. fatty acid esters, etc.), and further those of the polysiloxane type. By coating or incorporating these antistatic agents, conveying troubles by static charges during printing of the dye receiving member in sheet can be cancelled, and also when the dye receiving medium has a magnetic recording layer or an IC memory, electrostatic breaking of memory contents can be prevented. A preferable range of surface resistance value from such point of views may be $10^8$ to $10^{12}$ $\Omega/cm^2$. For imparting IC memory, optical memory, known techniques, such as those described in Japanese Laid-Open Patent Application No. 61-103287 can be applied.

Image formation

Generally speaking, heat transfer sheets may be classified broadly heat transfer sheets of the so called melt ink transfer type of which heat transfer layers are melted or softened by heating to be heat transferred imagewise onto a heat transferable material, and heat transfer sheets of the so called sublimation dye transfer type of which the dyes in the heat transfer layer are sublimated (heat migrated) by heating to have only the dyes heat transferred onto a heat transferable material.

When ID cards such as identification certificates, and the like are to be prepared with such heat transfer sheets as described above, in the case of heat transfer sheets of the melt ink transfer type, formation of monotonous images such as letters, figures, etc. can be done easily, but there is the problem that formation of gradation image such as face photographs can be done only with difficulty. On the contrary, in the case of heat transfer sheets of the sublimation transfer type, although gradation image of face photograph, etc. is excellent, images such as letters, symbols, etc. are deficient in density and sharpness, and no OCR letter, bar code, etc. readable with IR-ray can be formed. Thus, none of the sheets can form satisfactory images.

As the method for solving such drawbacks, the method which employs printing with the above-mentioned fusion type (melt type) transfer and printing with the sublimation type transfer sheet in combination is preferred.

The ink for formation of heat meltable ink layer to be used in the above method comprises a colorant and a vehicle, and may further contain various additives added therein, if desired.

As the colorant as mentioned above, of organic or inorganic pigments or dyes, those having good characteristics as the recording material, for example, having sufficient coloration density without discoloration or fading by light, heat, temperature, etc. are preferred. As the colorant, cyan, magenta, yellow, etc. may be also used, but for the purpose of the present invention, colorants of black which can print clear letters and symbols at high density are preferred.

As the vehicle, one comprising a wax as the main component, and otherwise mixtures of a wax with drying fat, resin, mineral oil, derivatives of cellulose and rubber, etc. may be employed.

Representative examples of wax may include microcrystalline wax, carunauba wax, paraffin wax, etc. Further, there may be employed various waxes such as Fischer-Tropsh wax, various low molecular weight polyethylenes, wood wax, beeswax, whale wax, insect wax, wool wax, shellac wax, canderilla wax, petrolatum, partially modified wax, fatty acid ester, fatty acid amide, etc. However, from the standpoint of adhesion to vinyl chloride resin, scratch resistance, the black ink should more preferably use a resin binder as shown below:

(1) Acrylic resin,
(2) Acrylic resin + Chlorinated rubber,
(3) Acrylic resin + Vinyl chloride/Vinyl acetate copolymer resin,
(4) Acrylic resin + Cellulose type resin,
(5) Vinyl chloride/vinyl acetate copolymer resin.

As the method for forming a heat meltable ink layer on a substrate film or a release layer previously provided thereon, there may be included, in addition to hot melt coating, the methods of coating the above ink according to many means such as hot lacker coating, gravure coating, gravure reverse coating, roll coating and others. The thickness of the ink layer formed should be determined so that the necessary density and the heat sensitivity can be matched and, for example, the thickness of the ink layer should be generally preferably within the range of from about 0.2 to 10 $\mu$m.

Prior to formation of the heat meltable ink layer as mentioned above, it is preferable to form a release layer on the surface of the substrate for making peeling of the heat meltable ink layer easier. Such release layer is formed of a peeling agent such as waxes, silicone waxes, silicone resin, fluorine resins, acrylic resins, cellulose resins, vinyl chloride/vinyl acetate copolymer resins, nitrocellulose resins, etc. The formation method may be the same as the formation method of the above-described sublimable dye layer and the heat meltable ink layer, and its thickness may be sufficiently about 0.1 to 5 $\mu$m. When matte printing or matte protective after transfer is desirable, various particles can be included in the release layer to make the surface matte.

Next, the sublimation type heat transfer sheet is to be described.

First, as the substrate film of the heat transfer sheet, the same substrate films which have been used in the heat transfer sheet of the prior art can be used as such, and also other films can be used, and are not particularly limited.

As specific examples of preferable substrates, for example, thin papers such as glassine paper, condenser paper, paraffin paper, etc. are useful, and otherwise there may be included plastics such as polyester, polypropylene, Cellophane, polycarbonate, cellulose acetate, polyethylene, polyvinyl chloride, polystyrene, nylon, polyimide, polyvinylidene chloride, ionomer, etc. or substrate films comprising composite materials of these with the above-mentioned papers.

The thickness of such substrate film can be suitably varied so that its strength and heat resistance, etc. may become adequate, but its thickness should be preferably 3 to 100 $\mu$m.

The dye layer of the heat transfer sheet is a layer having a sublimable dye carried on the substrate film as described above with any desired binder.

As the dye to be used, all of the dyes used for heat transfer films of the sublimation type known in the prior art are effectively available, and not particularly limited. For example, as some preferable dyes, there may be included, as red dyes, MS Red G, Macrolex Red Violet R, Ceres Red 7B, Samaron Red HBSL, SK Rubin SEGL, etc., also as yellow dyes, Phorone Brilliant Yellow, S-6GL, PTY-52, Macrolex Yellow S-6G, etc., and also as blue dyes, Kayaset Blue 714, Waxsoline Blue AP-FW, Phorone Brilliant Blue S-R, MS Blue 100, Dito Blue No. 1, etc.

As the binder for carrying the dye as mentioned above, all of those known in the prior art can be used, and preferable examples may include cellulose type resins such as ethyl cellulose, hydroxyl cellulose, ethylhydroxy cellulose, hydroxypropyl cellulose, methyl cellulose, cellulose acetate, cellulose acetate butyrate, etc.; vinyl resins such as polyvinyl alcohol, polyvinyl acetate, polyvinyl butyral, polyvinyl acetal, polyvinyl pyrrolidone, polyacrylamide, etc., but particularly polyvinyl acetal and polyvinyl butyral, etc. are preferable from such points as heat resistance, heat migratability of dye, etc.

The dye layer is formed basically of the materials as described above, but otherwise various additives known in the prior art can be also included, if necessary.

Such dye layer is formed preferably by preparing an ink for dye layer formation by dissolving or dispersing the respective components of the above-mentioned dye, binder resin and other optional components into an appropriate solvent, and printing and drying the ink on the above-mentioned substrate film according to the gravure printing method, etc. Of course, although monochromatic printing may be employed in carrying out such printing, for the purpose of the present invention, a multi-color printing of three colors of yellow, magenta and cyan or four colors with addition of black is preferable so that a color image can be formed.

Formation of protective layer

As described above, in the case of image formation of sublimation type, gradation image such as face photograph, etc. can be formed, but the formed image lacks luster due to absence of vehicle as different from conventional printing ink, and also for the same reason, there is the problem that it is inferior in durability such as friction resistance.

As the method for solving such problem, there is the method of laminating a transparent film on the image surface formed. However, this method is cumbersome in operation, and also since lamination is effected on the card as a whole, curl may occur on the card, and further no too thin film can be used in operation of the card, and therefore there is the problem that the card laminated becomes thick as a whole.

The above problem can be solved by forming a protective layer by use of a sheet for protective layer transfer as described below.

The sheet for protective layer transfer to be used in this method is characterized by providing releasably a protective layer release protective layer comprising a wax-containing transparent resin and a heat seal layer to be fusion transferred by heat onto the vinyl chloride resin on a substrate film.

When transfer of the protective layer is effected onto the surface of the image by use of the above-mentioned sheet, the protective layer is transferred easily onto the image by the heat during printing, and therefore an excellent printed matter excellent in durability, particularly friction resistance, luster, color formability, etc. and without generation of curl can be obtained by a simple operation.

Figure 4:
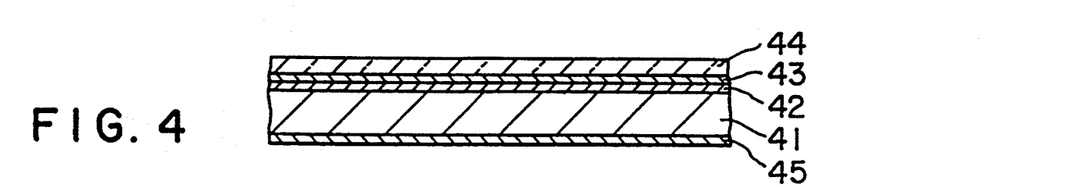
FIG. 4 is a sectional view of a protective layer transfer sheet.

FIG. 4 shows diagrammatically a sectional view of the protective layer transfer sheet according to a preferable example. The protective layer transfer sheet of this example has a release protective layer 43 comprising a wax-containing transparent resin provided releasably through an adhesion improving layer 42 on the substrate film 41.

In the Figure, 42 is an adhesion improving layer, which has the action of making better peel-off of the protective layer by improvement of the adhesion between the release protective layer and the substrate film. If adhesion between the release protective layer and the substrate film is poor, the portions other than the heating portion of the protective layer will be released together with the heating portion during transfer, whereby peel-off is worsened.

45 is a heat-resistant lubricating layer, which has the action of preventing sticking of the thermal head of a printer. The layer 45 is not required, when heating resistance and slipping characteristic of the substrate film are good.

As the above substrate film 41, the same substrate films as used in the heat transfer films of the prior art can be used as such, and also other films can be used and are not particularly limited.

As specific examples of the substrate film 41, for example, thin papers such as glassine paper, condenser paper, paraffin paper, etc. are useful, and otherwise there may be included plastics such as polyester, polypropylene, Cellophane, polycarbonate, cellulose acetate, polyethylene, polyvinyl chloride, polystyrene, nylon, polyimide, polyvinylidene chloride, ionomer, etc. or substrate films comprising composite materials of these with the above-mentioned papers.

The thickness of such substrate film 41 can be suitably varied so that its strength and heat resistance, etc. may become adequate, but its thickness should be preferably 3 to 100 $\mu$m.

As the adhesion improving layer 42, it may be one which consolidates adhesion between the substrate film and the release protective layer 43 and, for example, polyester type resins, polyurethane type resins, acrylpolyol type resins, vinyl chloride-vinyl acetate copolymer type resins, etc. may be used singly or as a mixture by coating. Also, if necessary, a reactive curing agent such as polyisocyanates, etc. may be also added. Further, titanate and silane type coupling agents may be also used. Also, two or more layers may be laminated, if necessary.

The release protective layer 43 is formed of a mixture of a transparent resin and a wax provided on the above-described adhesion improving layer.

As the transparent resin, there may be included polyester resins, polystyrene resins, acrylic resins, epoxy resins, modified cellulose resins, polyvinyl acetal resins, silicone resin, fluorine type resins, etc., preferably acrylic resins, silicone resins, fluorine resins. These resins are excellent in transparency, and form relatively tough coatings. Also, film peel-off during transfer is good. However, because lubricity is insufficient, damage is liable to be attached by surface friction.

In the present invention, lubricity of the protective layer is improved by mixing a wax with these transparent resins.

Representative examples of wax may include microcrystalline wax, carunauba wax, paraffin wax, etc. Further, there may be employed various waxes such as Fischer-Tropsh wax, various low molecular weight polyethylenes, wood wax, beeswax, whale wax, insect wax, wool wax, shellac wax, canderilla wax, petrolatum, partially modified wax, fatty acid ester, fatty acid amide, etc.

The amount of the above wax used may be preferably within the range of from 0.5 to 20 parts by weight per 100 parts by weight of the above-mentioned transparent resin, and if the amount of the wax used is too small, friction resistance of the protective layer during formation of the protective layer becomes insufficient, while if it is too much, durability, transparency of the protective layer coating becomes undesirably insufficient.

The method of mixing the above-described transparent resin and wax may include the method of melt mixing of both, the method of mixing by dissolving in an appropriate organic solvent capable of dissolving both, etc., and the mixing method is not particularly limited.

Particularly preferably, the transparent resin used as a dispersion (or emulsion), while the wax is used as a solution or a dispersion (emulsion), and the both are mixed together. After coating on the substrate film by use of such dispersions (emulsions), film formation is effected at a relatively lower temperature so that at least a part of these resin particles may remain. The coating thus formed has a rough surface because the resin particles remain to be partially turbid, but the surface becomes smooth by heat and pressure during heat transfer, whereby it can be transferred as a transparent coating.

As the method for forming the releasable protective layer 43 on the adhesion improving layer 42 previously provided on the substrate film 41, there may be included methods of coating and drying the ink comprising the resin and the wax as described above according to many means such as gravure coating, gravure reverse coating, roll coating, etc. When the transparent resin layer is formed from a mixed dispersion of the resin and the wax, drying after coating should be preferably conducted at a relatively lower temperature not higher than the melting point of the resin particles, for example, about 50° to 100° C. By drying at such temperature, the film is formed with remaining of resin particles, and therefore film peel-off during transfer is markedly improved to maintain lubricity of the transfer coating.

Also, substantially inorganic or organic fine particles can be mixed in the release protective layer. By mixing fine particles, peel-off, abrasion resistance of the release protective layer can be further improved. Also, a matte surface can be obtained by suppressing the luster of the surface.

As such fine particles, those with relatively higher transparency such as silica, and Teflon powder, nylon powder, etc. are preferable. The amount added may be preferably 1 to 30% by weight based on the resin of the release protective layer. In this case, if the amount added is too much, transparency of the protective layer, durability of the coating will be worsened.

The thickness of the release protective layer should be preferably 0.5 to 5 $\mu$m.

Further, on the surface of the above-mentioned release protective layer, for the purpose of making better transferability onto the dye image receiving member comprising a vinyl chloride resin, a heat seal layer 44 is provided. The heat seal layer is formed to a thickness preferably of about 0.5 to 10 $\mu$m by coating and drying a solution of a resin of good hot adhesion such as acrylic resins, vinyl chloride resin, vinyl chloride-vinyl acetate copolymer resins, acryl-vinyl chloride-vinyl acetate copolymers, polyester resins, polyamide resins, etc.

Among these resins, those having good adhesion to vinyl chloride resins and good peel-off are vinyl chloride-vinyl acetate copolymers, acryl-vinyl chloride-vinyl acetate copolymers, acrylic resins, polyamide resins.

Also, in forming the release protective layer and/or the heat seal layer as described above, by incorporating additives such as UV-ray absorbers, antioxidants, fluorescent brighteners, etc. in said layer, luster, light resistance, weathering resistance, whiteness, etc. of various images to be coated can be improved.

Having described above about the protective layer transfer sheet constitution to be used in the present invention, the protective layer of such protective layer transfer sheet may be provided alone on the substrate film, or may be also provided in plane succession with the sublimation type dye layer and the melt transfer ink layer as a matter of course, The images to be protected by use of the protective layer transfer sheet as described above are images according to the sublimation type heat transfer method and/or the melt ink type heat transfer method or bar codes which are letter informations, etc. on a dye receiving member comprising a vinyl chloride resin, but they are not limited to these. Particularly when applied to a sublimation transfer image, a protective layer of said image is formed, and also the dye which forms the image by the heat during transfer is subjected to the recolor formation treatment, whereby there is the effect that the image becomes further sharp.

The image receiving medium may be provided with emboss, sign, IC memory, optical memory, magnetic recording layer, other printings, etc., and it is also possible to provide emboss, sign, magnetic recording layer, etc. after the protective layer transfer. Also, by use of the card substrate of the present invention, emboss can be also applied on the face photograph after image formation, which is very effective for preventing alteration of the card.

A preparation example of the transfer printed matter by use of the dye image receiving member, and the protective layer transfer sheet of the present invention as described above is described by referring to FIG. 5, FIG. 6.

Figure 5:
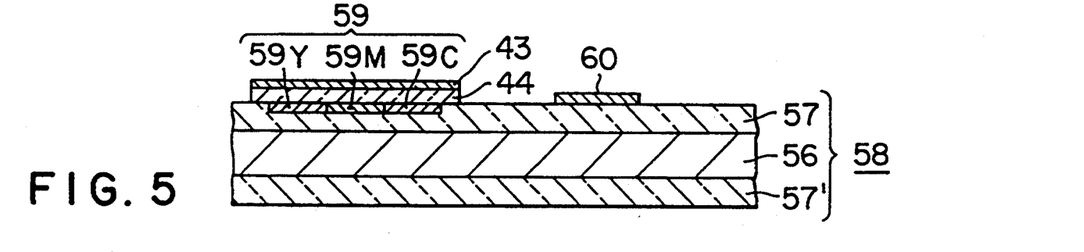
Figure 6:
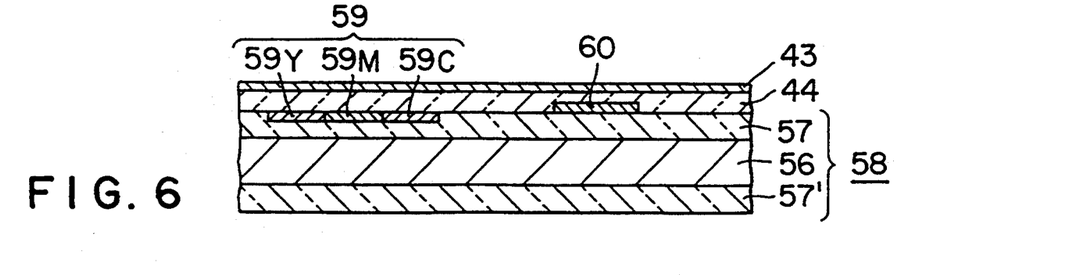

First, an image receiving medium 58 in the form of a card was prepared, having transparent vinyl chloride resins 57, 57' containing a plasticizer and a lubricant, but containing no colored pigment laminated on both surfaces of a center core 56 comprising a vinyl chloride resin comprising a white pigment. On the surface of the image receiving medium, a yellow dye layer for sublimation type heat transfer sheet was superposed, and a yellow image 59Y was transferred with a thermal printer which actuates following color separation signal. By transferring similarly the magenta image 59M and the cyan image 59C onto the same region, a desired color image 59 is formed. Next, by use of a melt ink type heat transfer sheet, desired letters, symbols, bar codes, etc. 58 are similarly printed. Further, by use of the protective layer transfer sheet as described above, the release protective layer and the heat seal layer on the above-mentioned color image 59 and/or the image 60 such as letters, etc. to form a protective layer. Thus, a card having formed desired information, images formed thereon can be formed.

In carrying out the transfer as described above, the thermal printers may be separately set for sublimation transfer, for melt ink transfer, for protective layer transfer sheet (preferably continuously), or alternatively, these transfers may be effected by adequate control of the respective printing energies with the common printer. In the present invention, the means for heating the protective layer transfer sheet is not limited to a thermal printer, but otherwise hot plates, hot rolls, iron, etc. may be also employed.

In the following, examples of the present invention are described in more detail by referring to Examples and Comparative Examples. In the sentences, parts and % are based on weight, unless otherwise particularly noted.

EXAMPLES 1 TO 7 AND COMPARATIVE EXAMPLES 1 TO 3

According to the compositions shown below in Table 1, dye receiving sheets (white card substrates) (thickness 0.2 mm, size 10×20 cm) of the present invention and Comparative Examples were prepared.

TABLE 1

| | Components | | | |
|---|---|---|---|---|
| | PVC | Pigment | Plasticizer | Lubricant |
| Example 1 | 100 | 10 | 0.5 | 0.0 |
| Example 2 | 100 | 10 | 1 | 0.0 |
| Example 3 | 100 | 10 | 3 | 0.5 |
| Example 4 | 100 | 10 | 5 | 1 |
| Example 5 | 100 | 10 | 10 | 0.0 |
| Example 6 | 100 | 10 | 10 | 3 |
| Example 7 | 100 | 10 | 10 | 5 |
| Comparative Example 1 | 100 | 10 | 0.0 | 0.0 |
| Comparative Example 2 | 100 | 10 | 15 | 0.0 |
| Comparative Example 3 | 100 | 10 | 20 | 0.0 |

PVC: polyvinyl chloride compound (polymerization degree 800) containing about 10% of an additive such as stabilizer, etc.;
Pigment: titanium oxide;
Plasticizer: DOP (dioctyl phthalate);
Lubricant: stearic acid amide.

Next, inks of three colors containing sublimable dyes of three colors having the compositions shown below respectively were prepared.

| Yellow ink: | |
|---|---|
| Disperse dye (Macrolex Yellow 6G, Bayer, C.I. Disperse Yellow 201) | 5.5 parts |
| Polyvinyl butyral resin (Ethlec BX-1, Sekisui Kagaku K.K., Japan) | 4.5 parts |
| Methyl ethyl ketone/toluene (weight ratio 1/1) | 89.0 parts |

Magenta ink
The same as yellow ink except for using a magenta disperse dye (C. I, Disperse Red 60) as the dye.

Cyan ink
The same as yellow ink except for using a cyan disperse dye (C. I. Solvent Blue 63) as the dye.

The above ink compositions were coated repeatedly according to the gravure coating method on the surface of a polyester film with a thickness of 4.5 μm having a heat-resistant slip layer (thickness 1 μm) formed on the back, and an adhesion improving layer (thickness 0.5 μm) on the surface in plane succession in the order of yellow, magenta and cyan respectively at a width of 15 cm and dried to a coated amount of about 3 g/m², to form a heat transfer sheet containing sublimable dye layers of three colors.

With the above sublimation type heat transfer sheet superposed on the surface of the card substrate as previously described, heat energy was imparted with a thermal head connected to the electrical signals obtained by color separation of a face photograph to effect sublimation transfer in the order of cyan, magenta and yellow, thereby forming a face photograph of full-color.

Next, on the surface of the same polyester film as described above, an ink for release layer having the composition shown below was coated according to the gravure coating method and dried at a ratio of 1 g/m² to form a release layer.

| Ink for release layer | |
|---|---|
| Acrylic resin | 20 parts |
| Methyl ethyl ketone | 100 parts |
| Toluene | 100 parts |

Next, on the surface of the above release layer was coated the ink shown below to a coated amount of about 3 g/m² and dried to form a heat meltable ink layer to prepare a heat melt type heat transfer sheet.

| Heat meltable ink | |
|---|---|
| Acryl/vinyl chloride/vinyl acetate copolymer resin | 20 parts |
| Carbon black | 10 parts |
| Toluene | 35 parts |
| Methyl ethyl ketone | 35 parts |

On the image blank portion of the card having the above-mentioned face photograph formed thereon, the melt ink type heat transfer sheet as described above was superposed, and letters such as figures, Chinese characters, etc. and signal images such as bar code, etc. were formed.

The color formed density, sharpness of the face photograph and abnormal transfer state of the heat transfer sheets during sublimation transfer of the cards of the present invention and Comparative Examples were examined to obtain the results shown below in Table 2.

TABLE 2

| | Performance | | |
|---|---|---|---|
| | Color formed density | Sharpness | Abnormal transfer resistance |
| Example 1 | ◎ | ◎ | ◎ |
| Example 2 | ◎ | ◎ | |
| Example 3 | | | |
| Example 4 | | | |
| Example 5 | | | ◎ |
| Example 6 | | | |
| Example 7 | | | |
| Comparative Example 1 | X | X*1 | X |
| Comparative Example 2 | | X*2 | |
| Comparative Example 3 | | X*2 | |

*1: dye layer of heat transfer sheet transferred partially as such, and resolution remarkably bad
*2: blurring occurred on image, and resolution bad The color formed density was compared with the naked eye, with the highest density being represented by ◉, moderate one by ◯, and inferior one by ×.

Sharpness was compared with the naked eye, and the sharpest one was represented by ◉, moderate one by ◯ and inferior one by ×.

Abnormal transfer resistance is represented by ◉ when peeling of the transfer sheet after sublimation transfer is easy, by ◯ when slightly difficult, and × when peeling is difficult and the dye layer itself is transferred onto the card substrate.

EXAMPLES 8 TO 14 AND COMPARATIVE EXAMPLES 4 TO 6

A white card substrate core (thickness 0.2 mm, size 30×30 cm) was prepared according to the composition shown below.

| | |
|---|---|
| Polyvinyl chloride (polymerization degree 800) compound containing about 10% of additives such as stabilizer, etc. | 100 parts |
| White pigment (titanium oxide) | 15 parts |

Next, transparent sheets were prepared according to the compositions shown below in Table 3 (thickness 0.15 mm), and thermally pressure adhered onto the both surfaces of the above white core to prepare card substrates of Examples and Comparative Examples.

TABLE 3

| | Components | | | |
|---|---|---|---|---|
| | PVC | Pigment | Plasticizer | Lubricant |
| Example 8 | 100 | — | 0.5 | 0.0 |
| Example 9 | 100 | — | 1 | 0.0 |
| Example 10 | 100 | — | 3 | 0.5 |
| Example 11 | 100 | — | 5 | 1 |
| Example 12 | 100 | — | 10 | 0.0 |
| Example 13 | 100 | — | 10 | 3 |
| Example 14 | 100 | — | 10 | 5 |
| Comparative Example 4 | 100 | — | 0.0 | 0.0 |
| Comparative Example 5 | 100 | — | 15 | 0.0 |
| Comparative Example 6 | 100 | — | 20 | 0.0 |

When gradation images and monotonous images were formed on the surface of the above card substrates in the same manner as in Example 1 and the same performances were examined, the same results as in Table 2 were obtained.

EXAMPLES 15 TO 19 AND REFERENCE EXAMPLES 1, 2

For examination of the influence of the soft temperature (according to the standard defined in JIS-K-6734) of the above polyvinyl chloride resin compositions constituting the image receiving media, the following tests were conducted.

First, on both surfaces of a center core with a thickness of 670 μm comprising a vinyl chloride resin containing a white pigment were laminated oversheets (thickness 70–150 μm) comprising transparent vinyl chloride resin compositions shown below, to form image receiving media. In this case, oversheets exhibiting those shown below in Table 4 as the soft temperature of the oversheet were prepared. The soft temperature was controlled by controlling suitably the kinds and amounts of plasticizers, lubricants, the molecular weights of PVC and copolymerization with other resins, etc.

Example 1: "Vinifoil C-1436" (product of Mitsubishi Jushi, K. K., Japan)
Example 2: "Vinifoil C-0436" (product of Mitsubishi Jushi, K. K., Japan)
Example 3: "Vinifoil C-0446" (product of Mitsubishi Jushi, K. K., Japan)
Example 4: "Vinifoil C-4020" (product of Mitsubishi Jushi, K. K., Japan)
Reference Example 1: "Vinifoil C-850" (product of Mitsubishi Jushi, K. K., Japan)
Reference Example 2: "Hisilex 502" (product of Mitsubishi Jushi, K. K., Japan).

For these sample media, presence of abnormal transfer, dye dyeability, blurring of image after printing, and emboss adaptability were tested. The results are shown below in Table 4.

TABLE 4

| | Example 15 | Example 16 | Example 17 | Example 18 | Example 19 | Reference Example 1 | Reference Example 2 |
|---|---|---|---|---|---|---|---|
| Softening temperature °C. | 66 | 65 | 62 | 60 | 57 | 85 | 45 |
| Abnormal transfer | Virtually none | Virtually none | Virtually none | none | none | none | none |
| Dye dyeability | Common | Common | Good | Good | Good | No good | Good |
| Blurring of image after printing | none | none | none | none | none | Entirely none | Generated |
| Emboss adaptability | Good | Good | Good | Good | Good | Unsuitable | Good |

EXAMPLES 20, 21 AND REFERENCE EXAMPLES 3 TO 5

EXAMPLE 20

On the other surface of a 4.5 μm PET film having a heat-resistant lubricating layer provided on one surface was provided a polyester type adhesion improving layer (0.1 μm), and further a heat seal layer and a peelable protective layer having the compositions shown below were successively coated according to the gravure coating method and dried to form a protective layer, thus preparing a protective layer transfer sheet.

| | |
|---|---|
| Releasable protective layer (coated amount after drying: 4 g/m²) | |
| Acrylic resin (Mitsubishi Rayon K.K., Japan: BR-83) | 20 wt. parts |
| Polyethylene wax | 1 wt. part |
| Methyl ethyl ketone | 50 wt. parts |
| Toluene | 50 wt. parts |
| Heat seal layer (coated amount after drying: 1 g/m²) | |
| Acryl · vinyl chloride · vinyl acetate copolymer (Showa Ink K.K., Japan: HS-32G) | 20 wt. parts |
| Methyl ethyl ketone | 100 wt. parts |
| Toluene | 100 wt. parts |

Next, with the above protective layer transfer sheet superposed on the image receiving medium having the image formed thereon in Examples as described above, heating was effected with a thermal head from the side of the heat-resistant lubricating layer to transfer the protective layer onto the dye image layer.

EXAMPLE 21

A protective layer transfer sheet was prepared in the same manner as in Example 20 except for changing the releasable protective layer, the heat seal layer to the compositions shown below.

| Releasable protective layer (coated amount after drying: 2 g/m²) | |
|---|---|
| Acrylic resin (Mitsubishi Rayon K.K., Japan: BR-85) | 20 wt. parts |
| Polyethylene wax | 1 wt. part |
| Fine particulate silica (Nippon Aerosil K.K., Japan: R-972) | 1 wt. part |
| Methyl ethyl ketone | 100 wt. parts |
| Toluene | 100 wt. parts |
| Heat seal layer (coated amount after drying: 1 g/m²) | |
| Nylon resin (Toa Gosei Kagaku K.K., Japan: FS 175) | 20 wt. parts |
| Methyl ethyl ketone | 100 wt. parts |
| Toluene | 100 wt. parts |

Next, in the same manner as in Example 20, the protective layer was transferred onto the dye image by use of the above protective layer transfer sheet.

REFERENCE EXAMPLE 3

On the other surface of a 4.5 μm PET film having a heat-resistant lubricating layer provided on one surface was provided a polyester type adhesion improving layer (0.1 μm), and on its upper surface was coated a protective layer comprising one layer having the following composition to prepare a protective layer transfer sheet.

| Protective layer (coated amount after drying: 4 g/m²) | |
|---|---|
| Polyvinyl butyral resin (Sekisui Kagaku K.K., Japan: Ethlec BX-1) | 20 wt. parts |
| Methyl ethyl ketone | 50 wt. parts |
| Toluene | 50 wt. parts |

Next, in the same manner as in Example 20, the protective layer was transferred onto the dye image by use of the above protective layer transfer sheet.

REFERENCE EXAMPLE 4

A protective layer transfer sheet was prepared in the same manner as in Example 20 except for changing the releasable protective layer, the heat seal layer to the compositions shown below.

| Releasable protective layer (coated amount after drying: 4 g/m²) | |
|---|---|
| Polystyrene resin (Denki Kagaku K.K., Japan: TP-SX301) | 20 wt. parts |
| Methyl ethyl ketone | 50 wt. parts |
| Toluene | 50 wt. parts |
| Heat seal layer (coated amount after drying: 1 g/m²) | |
| Ethylene · ethyl acrylate resin (Mitsui · Du Pont Polychemical K.K., Japan: A-704) | 20 wt. parts |
| Methyl ethyl ketone | 100 wt. parts |
| Toluene | 100 wt. parts |

Next, in the same manner as in Example 20, the protective layer was transferred onto the dye image by use of the above protective layer transfer sheet.

REFERENCE EXAMPLE 5

In Examples 1, an image receiving medium was prepared having no protective layer provided on the surface where the image was formed.

The dye transfer printed matters obtained as described above were evaluated to obtain the results shown below in Table 5.

TABLE 5

| | Transferability of protective layer | Abrasion resistance 1000 times | Abrasion resistance 3000 times |
|---|---|---|---|
| Example 20 | good thermal fusion exhibited to vinyl chloride resin, with sharp peel-off of protective layer | | ◎ |
| Example 21 | good thermal fusion exhibited to vinyl chloride resin, with sharp peel-off of protective layer | | ○ |
| Reference Example 3 | bad heat fusion to vinyl chloride resin, and transfer could not be effected | — | — |
| Reference Example 4 | heat fusion to vinyl chloride was good, but peel-off of protective layer was bad with disturbed edge | △ | X |
| Reference Example 5 | — | X | X |

*Friction resistance was measured by passing the sample through a gate adaptability tester (Tateishi Denki: NAW 2) for 1000 times and 3000 times, and the heat transfer printing recorded matter was observed with dyes.
◎: neither blurring of dye image by friction or haze of protective layer by damage was found.
○: no blurring of dye image by friction, but slight haze of protective layer by damage.
△: dye image slightly blurred by friction. Also, haze of protective layer was excessive, and image could by observed with difficulty.
X: dye image blurred by friction, and observation became impossible.

AVAILABILITY IN INDUSTRY

The image receiving medium of the present invention has excellent characteristics particularly as an image receiving medium in the form of a card, and can be used widely as various information cards such as identification certificate, driving license, membership card, etc.

We claim:

1. A protective layer transfer sheet, comprising:
    a substrate film;
    a heat-resistant layer provided on one surface of said substrate film
    an adhesive layer laminated on the other surface of said substrate film;
    a releasable protective layer laminated on said adhesive layer, said releasable protective layer comprising a transparent resin and a wax; and
    a heat seal layer laminated on said releasable protective layer.

2. The protective layer transfer sheet of claim 1, wherein said heat seal layer comprises at least one member selected from the group consisting of vinyl chloride-vinyl acetate copolymers, acryl resins, and polyamide resins.

3. The protective layer transfer sheet of claim 2, wherein said releasable protective layer further comprises at least one material selected from the group consisting of acrylic resins, silicone resins, and fluorine resins.

4. The protective layer transfer sheet of claim 2, wherein said heat seal layer further comprises acryl-vinyl chloride-vinyl acetate copolymers.

5. The protective layer transfer sheet of claim 1, wherein said adhesive layer comprises a resin selected from the group consisting of a polyester resin, polyurethane resin, acrylpolyol resin, and vinyl chloride-vinyl acetate copolymer resin.

6. The protective layer transfer sheet of claim 1, wherein said heat seal layer comprises acryl-vinyl chloride-vinyl acetate copolymers.

7. The protective layer transfer sheet of claim 1, wherein said wax is present in said releasable protective layer in an amount ranging from 0.5 to 20 parts by weight per 100 parts by weight of said transparent resin.

8. The protective layer transfer sheet of claim 1, further comprising at least one of a sublimation type dye layer and a melt transfer ink layer provided on said substrate film.

9. A protective layer transfer sheet comprising:
a substrate film; and
a protective layer releasably provided on said substrate film, said protective layer comprising a wax and a transparent resin, said wax being present in an amount ranging from 0.5 to 20 parts by weight per 100 parts by weight of said transparent resin.

10. The protective layer transfer sheet of claim 9, further comprising at least one of a sublimation type dye layer and a melt transfer ink layer provided on said substrate film.

11. The protective layer transfer sheet of claim 9, wherein said releasable protective layer further comprises at least one material selected from the group consisting of acrylic resins, silicone resins, and fluorine resins.

12. A protective layer transfer sheet comprising:
a substrate film;
a protective layer releasably provided on said substrate film, said protective layer comprising a wax; and
a heat seal layer provided on said releasable protective layer.

13. The protective layer transfer sheet of claim 12, wherein said heat seal layer comprises acryl-vinyl chloride-vinyl acetate copolymers.

14. The protective layer transfer sheet of claim 12, wherein said heat seal layer further comprises at least one member selected from the group consisting of vinyl chloride-vinyl acetate copolymers, acryl resins, and polyamide resins.

15. The protective layer transfer sheet of claim 12, wherein said releasable protective layer further comprises at least one material selected from the group consisting of acrylic resins, silicone resins, and fluorine resins.

* * * * *